United States Patent
Kalkunte et al.

(10) Patent No.: US 8,014,390 B2
(45) Date of Patent: Sep. 6, 2011

(54) POLICY BASED ROUTING USING A FAST FILTER PROCESSOR

(75) Inventors: Mohan Kalkunte, Sunnyvale, CA (US); Venkateshwar Buduma, San Jose, CA (US); Eric A. Baden, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 681 days.

(21) Appl. No.: 11/289,687

(22) Filed: Nov. 30, 2005

(65) Prior Publication Data
US 2006/0114908 A1 Jun. 1, 2006

Related U.S. Application Data

(60) Provisional application No. 60/631,548, filed on Nov. 30, 2004, provisional application No. 60/686,400, filed on Jun. 2, 2005.

(51) Int. Cl.
*H04L 12/28* (2006.01)
*H04L 12/56* (2006.01)
*G06F 9/00* (2006.01)
*G06F 15/16* (2006.01)
*G06F 17/00* (2006.01)

(52) U.S. Cl. ......... 370/389; 370/392; 370/400; 726/13
(58) Field of Classification Search .......... 370/392, 370/400
See application file for complete search history.

(56) References Cited

U.S. PATENT DOCUMENTS

| | | | |
|---|---|---|---|
| 6,041,042 A | 3/2000 | Bussiere | |
| 6,335,932 B2 | 1/2002 | Kadambi et al. | |
| 6,496,502 B1 | 12/2002 | Fite et al. | |
| 6,535,510 B2 | 3/2003 | Kalkunte et al. | |
| 6,674,743 B1 * | 1/2004 | Amara et al. | 370/351 |
| 6,792,502 B1 * | 9/2004 | Pandya et al. | 711/108 |
| 6,804,233 B1 | 10/2004 | Congdon et al. | |
| 6,807,179 B1 | 10/2004 | Kanuri et al. | |
| 6,963,921 B1 * | 11/2005 | Yang et al. | 709/230 |
| 6,993,026 B1 | 1/2006 | Baum et al. | |
| 7,031,304 B1 | 4/2006 | Arberg et al. | |
| 7,054,315 B2 | 5/2006 | Liao | |
| 7,127,566 B2 | 10/2006 | Ramakrishnan et al. | |
| 7,139,753 B2 | 11/2006 | Bass et al. | |
| 7,161,948 B2 | 1/2007 | Sampath et al. | |
| 7,292,567 B2 * | 11/2007 | Terrell et al. | 370/363 |
| 7,292,573 B2 | 11/2007 | LaVigne et al. | |
| 7,313,135 B2 | 12/2007 | Wyatt | |
| 7,327,748 B2 | 2/2008 | Montalvo et al. | |

(Continued)

OTHER PUBLICATIONS

Non-Final Office Action Received for U.S. Appl. No. 12/135,720 mailed on Mar. 19, 2009, 8 pages.

(Continued)

*Primary Examiner* — Hassan Phillips
*Assistant Examiner* — Lonnie Sweet (57) ABSTRACT

A network device for processing packets. The network device includes applying specific fields from a packet to an associated memory device and comparing means for comparing input to the memory device with entries in the memory device. The network device also includes enabling means for enabling selection of bits, by the memory device, that are required to match exactly with bits from the input to the memory device. The network device further includes outputting means for outputting an address for a matched entry by the memory device and applying means for applying a match from the memory device to an associated entry in a table for applying actions from the table that are associated with the match to the packet.

13 Claims, 4 Drawing Sheets

U.S. PATENT DOCUMENTS

| | | | |
|---|---|---|---|
| 7,359,383 B2 | 4/2008 | Wakumoto et al. | |
| 7,382,787 B1 * | 6/2008 | Barnes et al. | 370/401 |
| 7,408,932 B2 | 8/2008 | Kounavis et al. | |
| 7,408,936 B2 | 8/2008 | Ge et al. | |
| 7,417,990 B2 | 8/2008 | Ikeda et al. | |
| 7,499,456 B2 | 3/2009 | De Silva et al. | |
| 7,515,610 B2 | 4/2009 | Amagai et al. | |
| 7,525,919 B2 | 4/2009 | Matsui et al. | |
| 7,570,639 B2 | 8/2009 | Kalkunte et al. | |
| 7,680,107 B2 | 3/2010 | Kalkunte | |
| 7,715,384 B2 | 5/2010 | Kalkunte et al. | |
| 7,826,481 B2 | 11/2010 | Kalkunte et al. | |
| 7,830,892 B2 | 11/2010 | Kalkunte et al. | |
| 2002/0010791 A1 | 1/2002 | Kalkunte et al. | |
| 2002/0126672 A1 * | 9/2002 | Chow et al. | 370/392 |
| 2003/0123459 A1 * | 7/2003 | Liao | 370/401 |
| 2004/0236720 A1 | 11/2004 | Basso et al. | |
| 2005/0008009 A1 | 1/2005 | Chen et al. | |
| 2005/0013306 A1 | 1/2005 | Albrecht | |
| 2005/0018693 A1 | 1/2005 | Dull | |
| 2005/0076010 A1 | 4/2005 | Bass et al. | |
| 2005/0083885 A1 | 4/2005 | Ikeda et al. | |
| 2005/0083935 A1 * | 4/2005 | Kounavis et al. | 370/392 |
| 2005/0129019 A1 * | 6/2005 | Cheriton | 370/392 |
| 2005/0138149 A1 | 6/2005 | Bhatia | |
| 2005/0163102 A1 | 7/2005 | Higashitaniguchi et al. | |
| 2005/0180391 A1 | 8/2005 | Shimada | |
| 2005/0190773 A1 | 9/2005 | Yang et al. | |
| 2006/0002393 A1 * | 1/2006 | Lappin et al. | 370/392 |
| 2006/0114876 A1 | 6/2006 | Kalkunte | |
| 2006/0114901 A1 | 6/2006 | Kalkunte et al. | |
| 2006/0114915 A1 | 6/2006 | Kalkunte et al. | |
| 2006/0114938 A1 | 6/2006 | Kalkunte et al. | |
| 2006/0140130 A1 | 6/2006 | Kalkunte et al. | |
| 2006/0182034 A1 * | 8/2006 | Klinker et al. | 370/238 |
| 2008/0095062 A1 | 4/2008 | Shankar et al. | |
| 2008/0117913 A1 * | 5/2008 | Tatar et al. | 370/392 |
| 2010/0142536 A1 | 6/2010 | Kalkunte et al. | |

OTHER PUBLICATIONS

Notice of Allowance Received for U.S. Appl. No. 11/289,499, mailed on Apr. 3, 2009, 16 pages.

Non-Final Office Action Received for U.S. Appl. No. 11/289,499, mailed on Oct. 15, 2008, 12 pages.

Non-Final Office Action Received for U.S. Appl. No. 11/289,368, mailed on Mar. 19, 2009, 9 pages.

Non-Final Office Action Received for U.S. Appl. No. 11/289,369, mailed on Mar. 18, 2009, 19 pages.

Non-Final Office Action Received for U.S. Appl. No. 11/289,366, mailed on May 11, 2009, 9 pages.

Non-Final Office Action Received for U.S. Appl. No. 11/289,366, mailed on Oct. 27, 2008, 11 pages.

Non-Final Office Action Received for U.S. Appl. No. 11/289,370, mailed on Oct. 29, 2008, 7 pages.

Non-Final Office Action Received for U.S. Appl. No. 11/289,370, mailed on May 1, 2009, 7 pages.

Non-Final Office Action Received for U.S. Appl. No. 11/289,497, mailed on Oct. 15, 2008, 13 pages.

Final Office Action Received for U.S. Appl. No. 11/289,497, mailed on Mar. 18, 2009, 13 pages.

Notice of Allowance Received for U.S. Appl. No. 11/289,497, mailed on Jun. 12, 2009, 12 pages.

Notice of Allowance received for U.S. Appl. No. 11/289,368, mailed on Sep. 15, 2009, 17 pages.

Office Action received for U.S. Appl. No. 11/289,369, mailed on Oct. 13, 2009, 33 pages.

Notice of Allowance received for U.S. Appl. No. 11/289,370, mailed on Oct. 6, 2009., 12 pages.

Supplemental Notice of Allowability received for U.S. Appl. No. 11/289,497, mailed on Sep. 21, 2009, 17 pages.

Supplemental Notice of Allowability received for U.S. Appl. No. 11/289,370, mailed on Dec. 2, 2009, 8 pages.

Notice of Allowance received for U.S. Appl. No. 11/289,368, mailed on Jan. 14, 2010, 18 pages.

Office Action received for U.S. Appl. No. 11/289,366, mailed on Jan. 25, 2010, 17 pages.

Supplemental Notice of Allowability received for U.S. Appl. No. 11/289,497, mailed on Dec. 24, 2009, 17 pages.

U.S. Appl. No. 11/289,369, Notice of Allowance mailed Apr. 28, 2010, 50 pages.

U.S. Appl. No. 11/289,366 Non-Final Office Action mailed Jul. 6, 2010, 18 pages.

Notice of Allowance received for U.S. Appl. No. 11/289,370, mailed on Mar. 25, 2010, 9 pages.

Office Action received for U.S. Appl. No. 11/289,366, mailed on Dec. 23, 2010, 17 pages.

Office Action received for U.S. Appl. No. 11/289,366, mailed on Jul. 6, 2010, 12 pages.

Notice of Allowance received for U.S. Appl. No. 11/289,369, mailed on Aug. 16, 2010, 6 pages.

Notice of Allowance received for U.S. Appl. No. 11/289,369, mailed on Apr. 28, 2010, 12 pages.

Office Action received for U.S. Appl. No. 12/706,481, mailed on Sep. 16, 2010, 46 pages.

Notice of Allowance received for U.S. Appl. No. 11/289,370, mailed on Aug. 11, 2010, 8 pages.

US 7,769,029, 08/2010, Kalkunte et al. (withdrawn)

* cited by examiner

POLICY BASED ROUTING USING A FAST FILTER PROCESSOR

CROSS-REFERENCE TO RELATED APPLICATIONS

This application claims priority of U.S. Provisional Patent Application Ser. No. 60/631,548, filed on Nov. 30, 2004 and U.S. Provisional Patent Application Ser. No. 60/686,400, filed on Jun. 2, 2005. The subject matter of these earlier filed applications is hereby incorporated by reference.

BACKGROUND OF THE INVENTION

1. Field of the Invention

The present invention relates to a network device in a packet switched network and more particularly to a system and method of classifying packets and generating routing actions based on that classification.

2. Description of the Related Art

A packet switched network may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

As packets enter the device from multiple ports, they are forwarded to the ingress module where switching and other processing are performed on the packets. Thereafter, the packets are transmitted to one or more destination ports through the MMU and the egress module. According to a current switching system architecture, when the packet enters the switching device, a fast filter processor examines the packet and status information associated with the packet, among others, to create various outcomes for processing the packet. For example, one of the outcomes may indicate that the packet should be drop and another outcome may indicate that the packet should be sent to a specific interface. The device includes a meter mechanism for measuring how much packet data per a predefined unit of time is entering the device. The results from the metering mechanism may affect the outcome from the fast filter processor.

However, current implementations of the fast filter processor are difficult to scale to higher bandwidths and do not classify and/or filter packets across ports. The searching mechanisms of current fast filter processors also do not scale and as such will not hold up under increased bandwidth requirements of future devices with multiple 10 GE ports. Furthermore, some application might require filtering on bits and/or fields that are further in the packet than the 80 bytes that is used by current fast filter processor. The current fast filter processor, however, is not flexible in the selection of bits with which to filter.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
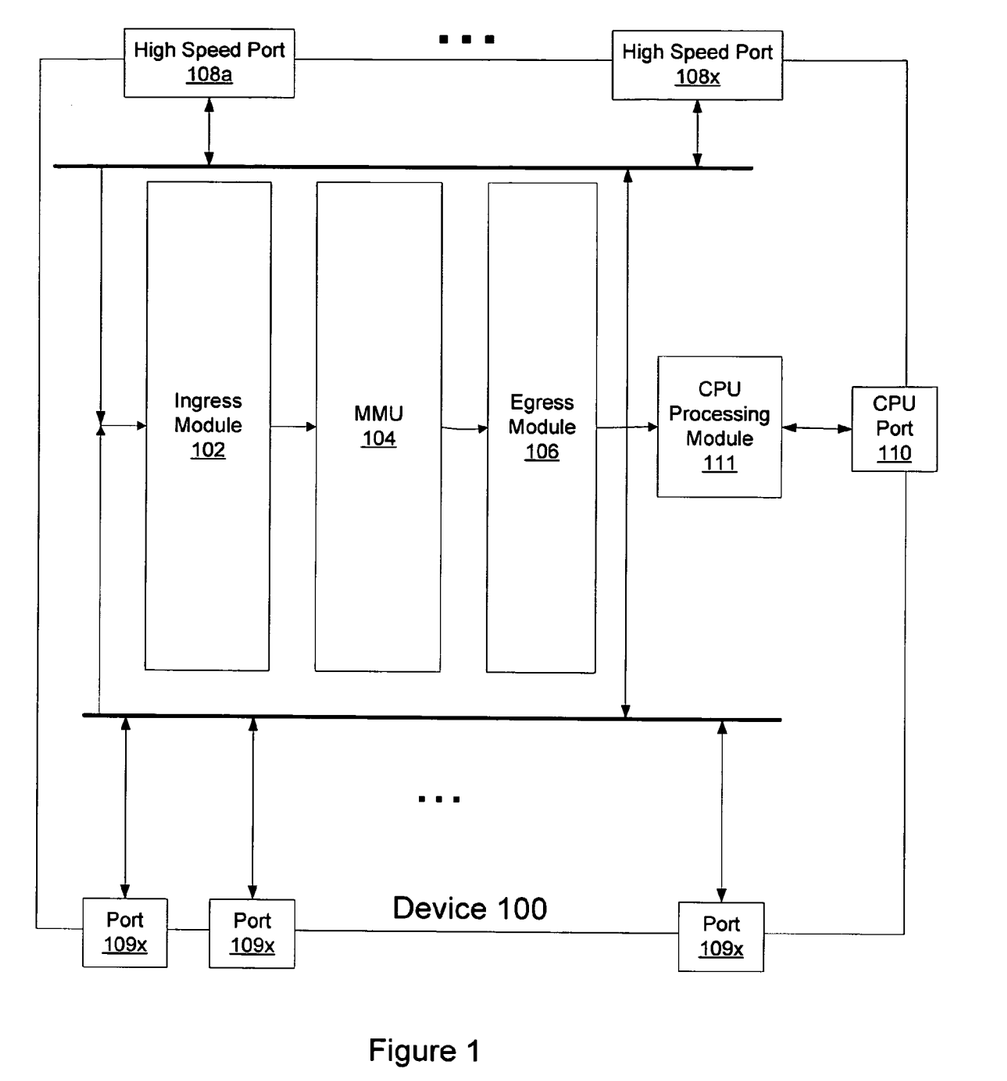
FIG. 1 illustrates a network device in which an embodiment of the present invention may be implemented.

FIG. 1 illustrates a network device, such as a switching chip, in which an embodiment the present invention may be implemented. Device 100 includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module. Device 100 implements a pipelined approach to process incoming packets. The device 100 has the ability of the pipeline to process, according to one embodiment, one packet every clock cycle. According to one embodiment of the invention, the device 100 includes a 133.33 MHz core clock. This means that the device 100 architecture is capable of processing 133.33 M packets/sec.

Device 100 may also include one or more internal fabric high speed ports, for example a HiGig™, high speed port 108*a*-108*x*, one or more external Ethernet ports 109*a*-109*x*, and a CPU port 110. High speed ports 108*a*-108*x* are used to interconnect various network devices in a system and thus form an internal switching fabric for transporting packets between external source ports and one or more external destination ports. As such, high speed ports 108*a*-108*x* are not externally visible outside of a system that includes multiple inter-connected network devices. CPU port 110 is used to send and receive packets to and from external switching/routing control entities or CPUs. According to an embodiment of the invention, CPU port 110 may be considered as one of external Ethernet ports 109*a*-109*x*. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109*a*-109*x*. Specifically, traffic in device 100 is routed from an external Ethernet source port to one or more unique destination Ethernet ports 109*a*-109*x*. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global a trunk group identifier (TGID). According to an embodiment, device 100 can support up to 128 trunk ports, with up to 8 members per trunk port, and up to 29 external physical ports. Destination ports 109a-109x on device 100 may be physical external Ethernet ports or trunk ports. If a destination port is a trunk port, device 100 dynamically selects a physical external Ethernet port in the trunk by using a hash to select a member port. As explained in more detail below, the dynamic selection enables device 100 to allow for dynamic load sharing between ports in a trunk.

Once a packet enters device 100 on a source port 109a-109x, the packet is transmitted to ingress module 102 for processing. Packets may enter device 100 from a XBOD or a GBOD. The XBOD is a block that has one 10 GE/12 G MAC and supports packets from high speed ports 108a-108x. The GBOD is a block that has 12 10/100/1 G MAC and supports packets from ports 109a-109x.

Figure 2:
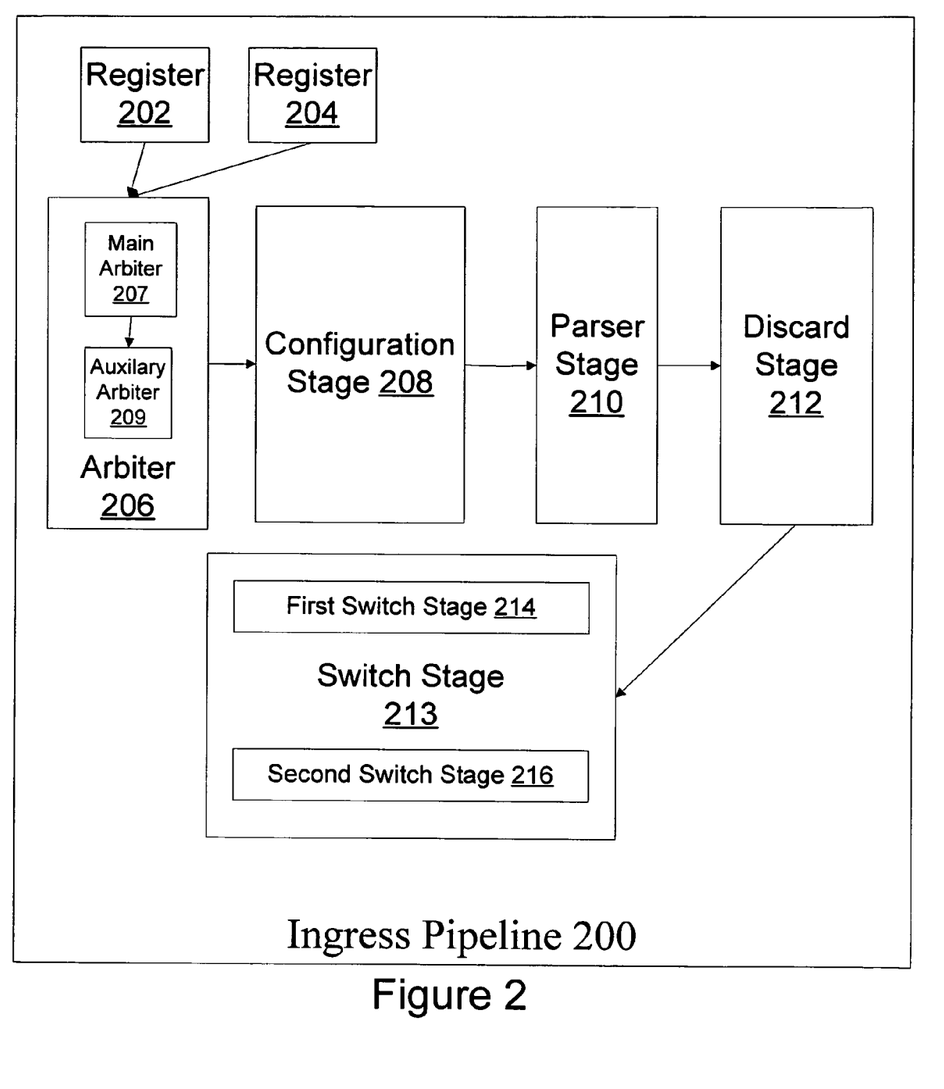
FIG. 2 illustrates a centralized ingress pipeline architecture.

FIG. 2 illustrates a centralized ingress pipeline architecture 200 of ingress module 102. Ingress pipeline 200 processes incoming packets, primarily determines an egress bitmap and, in some cases, figures out which parts of the packet may be modified. Ingress pipeline 200 includes a data holding register 202, a module header holding register 204, an arbiter 206, a configuration stage 208, a parser stage 210, a discard stage 212 and a switch stage 213. Ingress pipeline 200 receives data from the XBOD, GBOD or CPU processing module 111 and stores cell data in data holding register 202. Arbiter 206 is responsible for scheduling requests from the GBOD, the XBOD and CPU. Configuration stage 208 is used for setting up a table with all major port-specific fields that are required for switching. Parser stage 210 parses the incoming packet and a high speed module header, if present, handles tunnelled packets through Layer 3 (L3) tunnel table lookups, generates user defined fields, verifies Internet Protocol version 4 (IPv4) checksum on outer IPv4 header, performs address checks and prepares relevant fields for downstream lookup processing. Discard stage 212 looks for various early discard conditions and either drops the packet and/or prevents it from being sent through pipeline 200. Switching stage 213 performs all switch processing in ingress pipeline 200, including address resolution.

According to one embodiment of the invention, the ingress pipeline includes one 1024-bit cell data holding register 202 and one 96-bit module header register 204 for each XBOD or GBOD. Data holding register 202 accumulates the incoming data into one contiguous 128-byte cell prior to arbitration and the module header register 204 stores an incoming 96-bit module header for use later in ingress pipeline 200. Specifically, holding register 202 stores incoming status information.

Ingress pipeline 200 schedules requests from the XBOD and GBOD every six clock cycles and sends a signal to each XBOD and GBOD to indicate when the requests from the XBOD and GBOD will be scheduled. CPU processing module 111 transfers one cell at a time to ingress module 102 and waits for an indication that ingress module 102 has used the cell before sending subsequent cells. Ingress pipeline 200 multiplexes signals from each of XBOD, GBOD and CPU processing based on which source is granted access to ingress pipeline 200 by arbiter 206. Upon receiving signals from the XBOD or GBOD, a source port is calculated by register buffer 202, the XBOD or GBOD connection is mapped to a particular physical port number on device 100 and register 202 passes information relating to a scheduled cell to arbiter 206.

When arbiter 206 receives information from register buffer 202, arbiter 206 may issue at least one of a packet operation code, an instruction operation code or a FP refresh code, depending on resource conflicts. According to one embodiment, the arbiter 206 includes a main arbiter 207 and auxiliary arbiter 209. The main arbiter 207 is a time-division multiplex (TDM) based arbiter that is responsible for scheduling requests from the GBOD and the XBOD, wherein requests from main arbiter 207 are given the highest priority. The auxiliary arbiter 209 schedules all non XBOD/GBOD requests, including CPU packet access requests, CPU memory/register read/write requests, learn operations, age operations, CPU table insert/delete requests, refresh requests and rate-limit counter refresh request. Auxiliary arbiter's 209 requests are scheduled based on available slots from main arbiter 207.

When the main arbiter 207 grants an XBOD or GBOD a slot, the cell data is pulled out of register 202 and sent, along with other information from register 202, down ingress pipeline 200. After scheduling the XBOD/GBOD cell, main arbiter 207 forwards certain status bits to auxiliary arbiter 209.

The auxiliary arbiter 209 is also responsible for performing all resource checks, in a specific cycle, to ensure that any operations that are issued simultaneously do not access the same resources. As such, auxiliary arbiter 209 is capable of scheduling a maximum of one instruction operation code or packet operation code per request cycle. According to one embodiment, auxiliary arbiter 209 implements resource check processing and a strict priority arbitration scheme. The resource check processing looks at all possible pending requests to determine which requests can be sent based on the resources that they use. The strict priority arbitration scheme implemented in an embodiment of the invention requires that CPU access request are given the highest priority, CPU packet transfer requests are given the second highest priority, rate refresh request are given the third highest priority, CPU memory reset operations are given the fourth highest priority and Learn and age operations are given the fifth highest priority by auxiliary arbiter 209. Upon processing the cell data, auxiliary arbiter 209 transmits packet signals to configuration stage 208.

Configuration stage 208 includes a port table for holding all major port specific fields that are required for switching, wherein one entry is associated with each port. The configuration stage 208 also includes several registers. When the configuration stage 208 obtains information from arbiter 206, the configuration stage 208 sets up the inputs for the port table during a first cycle and multiplexes outputs for other port specific registers during a second cycle. At the end of the second cycle, configuration stage 208 sends output to parser stage 210.

Parser stage 210 manages an ingress pipeline buffer which holds the 128-byte cell as lookup requests traverse pipeline 200. When the lookup request reaches the end of pipeline 200, the data is pulled from the ingress pipeline buffer and sent to MMU 104. If the packet is received on a high speed port, a 96-bit module header accompanying the packet is parsed by parser stage 210. After all fields have been parsed, parser stage 210 writes the incoming cell data to the ingress pipeline buffer and passes a write pointer down the pipeline. Since the packet data is written to the ingress pipeline buffer, the packet data need not be transmitted further and the parsed module header information may be dropped. Discard stage 212 then looks for various early discard conditions and, if one or more of these conditions are present, discard stage drops the packet and/or prevents it from being sent through the chip.

Switching stage 213 performs address resolution processing and other switching on incoming packets. According to an embodiment of the invention, switching stage 213 includes a first switch stage 214 and a second switch stage 216. First switch stage 214 resolves any drop conditions, performs BPDU processing, checks for layer 2 source station movement and resolves most of the destination processing for layer 2 and layer 3 unicast packets, layer 3 multicast packets and IP multicast packets. The first switch stage 214 also performs protocol packet control switching by optionally copying different types of protocol packets to the CPU or dropping them. The first switch stage 214 further performs all source address checks and determines if the layer 2 entry needs to get learned or re-learned for station movement cases. The first switch stage 214 further performs destination calls to determine how to switch packet based on a destination switching information. Specifically, the first switch stage 214 figures out the destination port for unicast packets or port bitmap of multicast packets, calculates a new priority, optionally traps packets to the CPU and drops packets for various error conditions. The first switch stage 214 further handles high speed switch processing separate from switch processing from port 109a-109i and switches the incoming high speed packet based on the stage header operation code.

Figure 3:
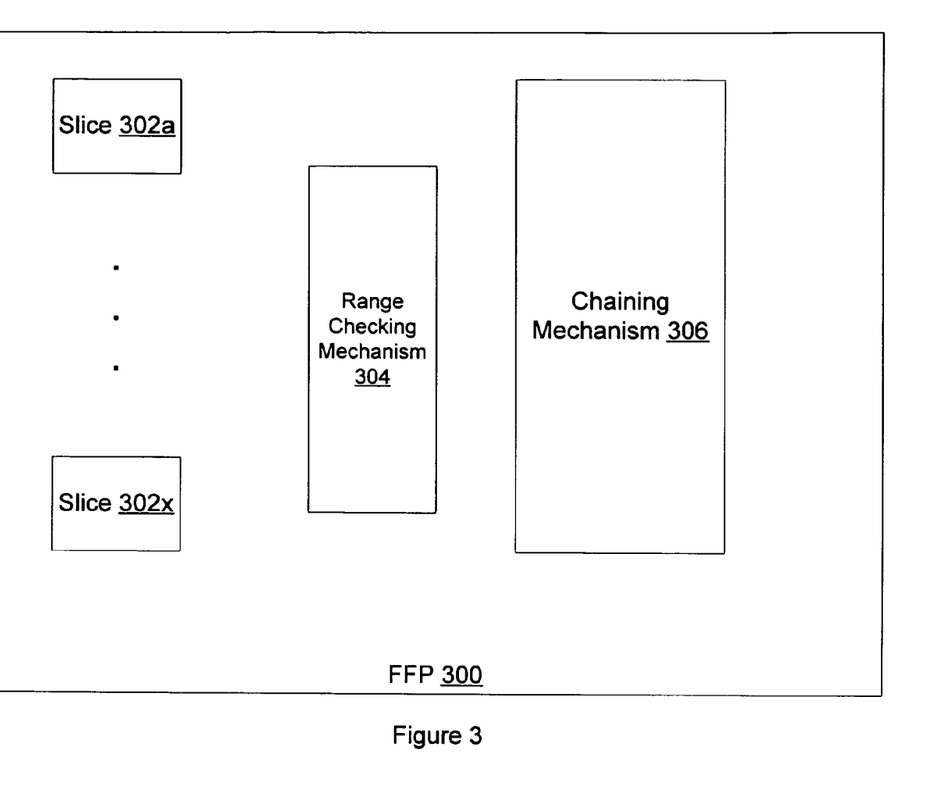
FIG. 3 illustrates a fast filter processor implemented in an embodiment of the invention.

After first switch stage 214 processes the packet, a destination port bitmap is produced for multicast packets and a unicast port/trunk is transmitted to later stages for unicast packets. A fast filter processor (FFP) then filters the packet based primarily on fields from the packet. FIG. 3 illustrates the fast filter processor implemented in an embodiment of the invention. FFP 300 includes a number of slices 302a-302x for classifying packets and generating actions based on that classification, at least one range checking mechanism 304 for performing range checks on source and destination port numbers and a chaining mechanism 306 for doubling the amount of data that is used to determine a match.

When a packet is processed by the ingress pipeline, the parser may parse standard Ethernet fields and/or user defined fields. For example, the parser may parse a 48 bit destination MAC address, a 48 bit source MAC address, a 16 bit Ethernet Type, a 16 bit outer VLAN tag, a 16 bit inner VLAN tag, a 32 bit Destination IPv4 address, a 32 bit source IPv4 address, a 128 bit destination IPv6 address, a 128 bit source IPv6 address, a 8 bit IP protocol, a 2 bit IP flag, a 6 bit TCP flag, IPv6 fields, a 16 bit destination TCP/UDP port, a 16 bit source TCP/UDP port and a 8 bit DSCP field. According to an embodiment, two user defined fields may also be parsed by the parser. Each of the user defined fields is 128 bits in width and is made of any four groups of four contiguous bytes from the first 128 bytes of the packet. When the packet reaches FFP 300, it may also obtain other fields that do not come directly from the packet. For example, the source port and module identifier, a destination port and module identifier, a discard status, a lookup status, packet format information, IP information, packet resolution information and module header option codes may be applied by FFP 300.

Figure 4:
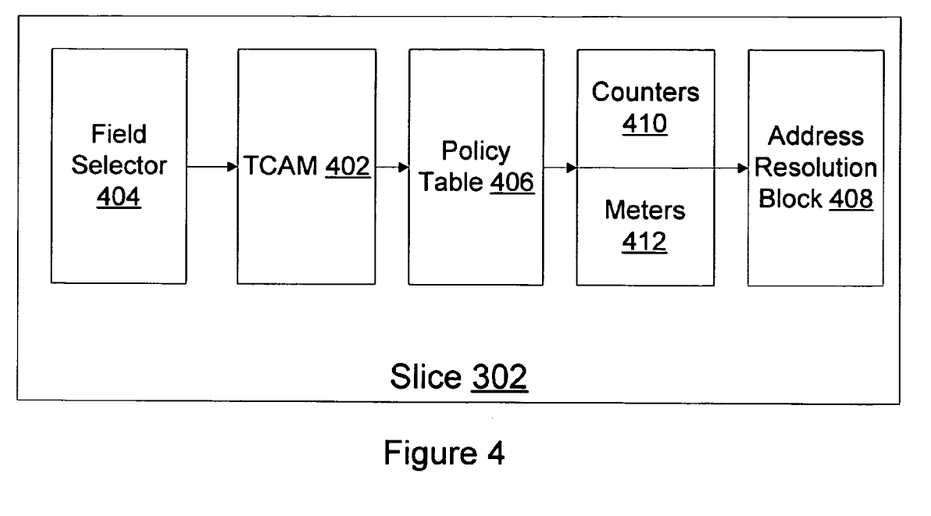
FIG. 4 illustrates a slice implemented in an embodiment of the invention.

FIG. 4 further illustrates a slice 302 implemented in an embodiment of the invention. According to an embodiment of the invention, FFP 300 may include up to 16 slices 302, that each operates on a field selection approach, wherein specific fields are parsed from an incoming packet and applied to a Ternary Content Addressable Memory (TCAM), described below. Specifically, each of slices 302 includes a TCAM 402, field selectors 404, a policy table 406, one action resolution block 408. Each slice 302 may also include one group of counter 410 and one group of meters 412. The number of slices 302 and the number of entries per slice 302 has no effect on the performance of FFP 300. FPP 300 processes a packet every clock, and therefore has enough bandwidth with a 133 MHz clock to support 4 GE ports and 4-10 GE ports or 12 Gbps high speed ports at the same time. It should be noted that each slice 302 is an independent searching mechanism that is capable of creating actions and updating meters 412 and counters 410. So if in an embodiment, there are 16 slices 302, there would be 16 separate filters running in parallel. It is therefore possible to generate 16 matches per packet along with 16 meter updates and 16 counter updates.

Each slice 302 uses an associated TCAM 402 for classifying the packets. TCAM 402 is a memory with insertion and deletion support that compares a primary input bus, which in one embodiment is the width of the memory, with all of its entries and outputs an address for a matched entry. TCAM 402 has a mask of each memory entry to enable selection of bits, in each entry, that are required to match exactly with the bits from the primary input bus to determine a match. If there is more than one match, TCAM 402 prioritizes multiple matches based on the address of the match. Software associated with slice 302 prioritizes the entries in TCAM 402 appropriately. In an embodiment, the entry with the lowest physical address is assigned the highest priority.

When the software inserts a rule in a content addressable memory, the software determines the priority of that rule over all of the other rules within the same field. To aid in the insertion or deletion of a rule within a group of rules that have the same characteristics, FFP 300 provides an address view for both read and write commands that enables the software to access an entry that includes a TCAM key, TCAM mask and an associated policy table data. This allows the software to, either directly or through Direct Memory Access mechanism, move whole entries consistently with FFP 300.

Policy table 406 is used to store actions associated with a match from TCAM 402. Policy table 406 includes one entry for each entry of TCAM 402 and the associated entry in policy table 406 includes all of the actions associated with the TCAM entry. In one embodiment, there are four types of actions associated with policy table 406. A profile ID indicates profile independent action bits, a red profile field indicates red profile action bits, a yellow profile field indicate yellow profile action bits and a green profile field for indicated green profile action bits. Based on the action bits in policy table 406, device 100 may drop, replace, redirect and/or copy information to the CPU.

Given the number of combinations of the information entering FFP 300, an embodiment of the invention divides the fields applied to each slice 302 into three sections. According to an embodiment of the invention, each TCAM entry includes the three sections. Specifically, each entry includes a 32 bit first field section, a 128 bit second field section, a 16 bit third field section, a Input Port Bit Map (IPBM) select bit, a space bit, a 5 bit source port number, a high speed packet bit and a 2 bit valid field. The valid field indicates if the entry is valid and should be used for comparison; the source port number is used to match which port a particular TCAM entry is programmed for; the high speed packet bit indicates whether or not the packet is a high speed packet; and the IPBM select bit indicates that the first field section is programmed to used the IPBM as an input. The first field includes up to 32 bits of IPBM. As such if the user selects the IPBM then an extra mask is applied to the TCAM. This mechanism thus allows for multiple ports to share a rule within a TCAM entry. In an embodiment, the user may program a TCAM entry first field section for which ports are allowed to match on that rule and device 100 will ensure that only those ports do indeed match on that rule by logically combining a global mask with the associated mask bits of the entry. Each port has a selector for the first field, the second field and the third field on a per slice basis.

One embodiment of the invention includes 128 meters 412 for each slice 302. Meters 412 are divided into 64 even meters and 64 odd meter, wherein index, test, and update bits are provided, in policy table 406, for each set of meters 412. A meter index field indicates which meter is used for testing and/or for updating from the set of 128 meters. The meter index field is used for default, flow, and color modes of operation. If the default mode is selected, the packet is determined to be green and no actual bucket updates occur. The flow mode is a normal mode in which all selected buckets must be in profile for the packet to be considered in profile. A color blind mode determines the color of an incoming packet only based on the profile status of each bucket. A color aware mode determines the color of an incoming packet based on the profile status of each bucket and the incoming color of the packet. The test and update bits are only used for the flow mode. The test bit indicates that the meter should be considered when determining the profile status or color of the packet. The update bit indicates that the meter should be updated based on the color of the packet. In the flow mode, all meters that are tested by the test bit must be in-profile for the packet to be determined to be green or else the packet is read. If the packet is determined to be green, then all meters whose update bit is on will be updated. If the mode is a flow mode, at least one of the meters must be selected by the test bit. Multiple policy table entries may point to the same meter indices, wherein one entry could be using two meters in one mode and the second entry could by using two meters in a different mode.

One embodiment of the invention includes 128 counters 410 for each slice 302. Each counter is 32 bits wide. Policy table 406 includes a counter index field and a counter mode field that control the updates of counters 410. Full match in each slice 302 may be capable of updating one counter 410 in a counter pair. Policy table 406 fields indicate which counter to update and how to update the counter. The counter index indicates which counter pair to use, wherein the counter pair includes an upper counter and a lower counter.

Figure 5:
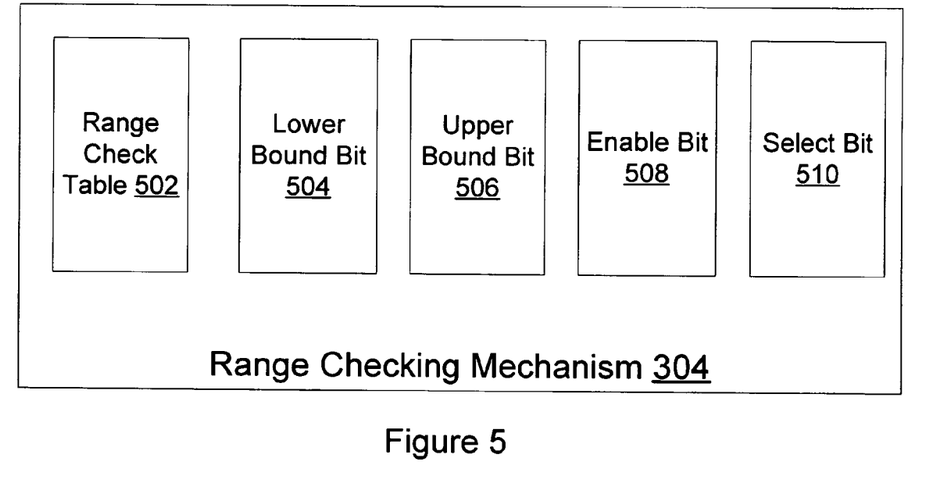
FIG. 5 illustrates a range checking mechanism implemented in a Fast Filter Processor.

FIG. 5 illustrates range checking mechanism 304 implemented in FFP 300. Range checking mechanism 304 is associated with range check table 502 with 16 entries, each of which includes a 16 bit lower bound 504, a 16 bit upper bound 506, an enable bit 508 and a source-destination select bit 510. Lower and upper bound 504 and 506 define a range within which the value of a selected port number must fall. Enable bit 508 indicates if range checker 304 is on and source-destination select bit 510 determines if range checker 304 is checking a source or destination UDP port number. According to an embodiment, FFP 300 includes 16 range checkers 304. Results from each range checker 304 may be selected as one of the sets of inputs to a TCAM 402. As such, range checker 304 is part of the classification mechanism.

FFP 300 includes a chaining mechanism 403 for doubling the amount of data that is used to determine a full match. As such there must be a match in two slices 402 for any action to take effect. Any entry in policy table 406 can be set to chain. However, in an embodiment, only an even/odd slice pair can be used to extend the matching data. As such, an entry in slice N may only be chained with an entry in slice N+1. When a TCAM entry matches against the input key, policy table 406 is read to determine if a chain bit is set. If both the TCAM entries in an even/odd pair, such as slice 0 and slice 1, find matches and both have their chain bit set in the respective policy table entries, then the two slices are potentially chained. To determine if the slices are to be chained, a determination of which entry in the even numbered slice is selected or allowed to be chained with the entry in the odd numbered slice. The mechanism to control which entry in an even numbered slice is allowed to chain with an entry in the odd numbered slice re-use or overlay bits in policy table 406 entry for the odd numbered slice, if a chain bit is set in that entry. There are 8 bits overlayed that include a valid bit and a 7 bit index which indicates which entry in the even numbered slice is allowed to be chained with that entry in the odd numbered slice.

One embodiment of the invention includes a layer 3 table for Internet Protocol version 4 (IPv4) routing and Internet Protocol version 6 (IPv6) routing. As mentioned above, the parser may parse a 48 bit destination MAC address, a 48 bit source MAC address, a 16 bit Ethernet Type, a 16 bit outer VLAN tag, a 16 bit inner VLAN tag, a 32 bit Destination IPv4 address, a 32 bit source IPV4 address, a 128 bit destination IPv6 address, a 128 bit source IPv6 address, a 8 bit IP protocol, a 2 bit IP flag, a 6 bit TCP flag, IPv6 fields, a 16 bit destination TCP/UDP port, a 16 bit source TCP/UDP port and a 8 bit DSCP field. When the packet reaches FFP 300, it may also obtain other fields that do not come directly from the packet. For example, the source port and module identifier and a destination port and module identifier. If FPP 300 is to be used to determine a routing action for an IPv4 packet, 32 bits in the IP address and the TCP port numbers are used to lookup an entry in TCAM 402. If FPP 300 is to be used to determine a routing action for an IPv6 packet, the upper 64 bits in the 128 bit IP address and the TCP port numbers are used to lookup an entry in TCAM 402. The bits used from the IP address, may be obtained from the IP source address or the IP destination address. As such, a route table is to be produced from the IP address and the port numbers. Policy table 406 produces an associated action when a match is found in TCAM 402. In one embodiment of the invention, the action is a layer 3 switch action that produces a next hop index which is used to obtain an egress port, a layer 3 interface, a MAC address, a VLAN and other routing information.

Returning to FIG. 2, second switch stage 216 then performs FFP action resolution, source port removal, trunk resolution, high speed trunking, port blocking, CPU priority processing, end-to-end Head of Line (HOL) resource check, resource check, mirroring and maximum transfer length (MTU) checks for verifying that the size of incoming/outgoing packets is below a maximum transfer length. The second switch stage 216 takes first switch stage 216 switching decision, any layer routing information and FP redirection to produce a final destination for switching. The second switch stage 216 also removes the source port from the destination port bitmap and performs trunk resolution processing for resolving the trunking for the destination port for unicast packets, the ingress mirror-to-port and the egress mirror-to-port. The second switch stage 216 also performs high speed trunking by checking if the source port is part of a high speed trunk group and, if it is, removing all ports of the source high speed trunk group. The second switch stage 216 further performs port blocking by performing masking for a variety of reasons, including meshing and egress masking.

Upon processing the packet it is delivered to MMU 104 which forwards the packet to egress module 106. Upon receiving the packet from MMU 104, egress module 106 supports multiple egress functions for a 72 gigabyte port bandwidth and a CPU processing bandwidth. According to an embodiment, egress module 106 is capable of handling more than 72 Gig of traffic, i.e., 24 one GE port, 4 high speed ports (12 G) and a CPU processing port of 0.2 GE. Egress module 106 receives original packets, as inputted from Ethernet ports 109*a*-109*i*, from MMU 104, and may either transmit modified or unmodified packets to destination ports 109*j*-109*x*.

According to one embodiment of the invention, all packet modifications with device 100 are made in egress module 106 and the core processing of egress module 106 is capable of running faster than the processing of destination ports 109j-109x. Therefore, egress module 106 provides a stall mechanism on a port basis to prevent ports 109j-109x from becoming overloaded and thus services each port based on the speed of the port.

In an embodiment of the invention, egress module 106 is connected to MMU 104 by a 1024 bits data interface and all packets transmitted from MMU 104 passes through egress module 106. Specifically, MMU 104 passes unmodified packet data and control information to egress module 106. The control information includes the results of table lookups and switching decisions made in ingress module 102. The data bus from MMU 106 is shared across all ports 108 and 109 and the CPU processing 111. As such, the bus uses a "request based" TDM scheme, wherein each Gig port has a turn on the bus every 72 cycles and each high speed Port 108 has a turn every 6 cycles. CPU processing packet data is transmitted over bubbles—free spaces occurring on the bus. Upon receiving the information for MMU 104, egress module 106 parses the packet data, performs table lookups, executes switch logic, modifies, aligns and further buffers the packet before the data is transmitted to the appropriate destination port 109i-109j.

Egress module 106 is connected to CPU processing module 111 through a 32 bit S-bus interface which the CPU uses to send requests to egress module 106. The requests are typically for reading the egress module's resources, i.e., registers, memories and/or stat counters. Upon receiving a request, egress module 106 converts the request into a command and uses a mechanism, described in detail below, for storing and inserting CPU instructions into a pipeline wherever there is an available slot on the pipeline.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate. It should be appreciated that by using the FFP, there is no need for dedicated tables for policy based routing. The user has the flexibility to choose fields of interest to determine their own policy based routing.

With respect to the present invention, network devices may be any device that utilizes network data, and can include switches, routers, bridges, gate-ways or servers. In addition, while the above discussion specifically mentions the handling of packets, packets, in the context of the instant application, can include any sort of datagrams, data packets and cells, or any type of data exchanged between network devices.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for routing packets, the network device comprising:
    a processor comprising a plurality of slices for classifying a received packet and for performing at least one action based on a classification of the received packet, wherein each of the plurality of slices comprises:
    a field selector configured to select at least one field from the received packet, and to apply the at least one field to the input of a ternary content addressable memory (TCAM);
    a rules table, implemented as a plurality of entries in the TCAM, wherein the TCAM is configured to compare the input to each entry and to output the address of a matching entry, and wherein each entry in the TCAM includes an input port bit map that identifies the ports on the network device to which the entry applies; and
    a policy table comprising a plurality of entries, wherein each entry in the policy table is indexed by the address of an associated entry in the TCAM, and includes at least one action to be performed by the network device.

2. The network device according to claim 1, wherein the field selector is configured to select an IP address associated with the received packet and a port identifier associated with a port on which the packet was received.

3. The network device according to claim 2, wherein the TCAM is configured to mask the IP address to obtain predefined bits from the IP address, wherein the predefined bits are determined based on a type of routing that is to be performed.

4. The network device according to claim 2, wherein the processor is configured to use the IP address and the port identifier to search the TCAM for a matching entry.

5. The network device according to claim 4, wherein the processor is configured to use information from the matching entry to obtain an action from an associated entry in the policy table, wherein the action is a layer 3 switch action.

6. The network device according to claim 1, wherein the policy table is configured to provide a next hop index, wherein the next hop index is used to obtain routing information for the packet.

7. The network device according to claim 1, wherein the policy table comprises storing means for storing actions associated with the match.

8. A method for processing packets, the method comprising:
    parsing at least one field from a received packet and applying the at least one field to an input of a ternary content addressable memory (TCAM) device, wherein each entry in the TCAM includes an input port bit map that identifies the ports on a network device to which the entry applies;
    using a mask to select bits from the at least one parsed field that are required to match exactly with bits from an entry in the TCAM;
    outputting an address for an entry in the TCAM when the selected bits from the at least one parsed field match exactly with the bits from the entry in the TCAM; and
    using the output address to obtain an action from an action table and performing the action.

9. The method according to claim 8, wherein parsing at least one field from the received packet comprises parsing an IP address associated with the packet and a port identifier associated with a port on which the packet was received.

10. The method according to claim 9, wherein using a mask to select bits from the at least one field comprises using a mask to obtain predefined bits from the IP address, wherein the predefined bits are determined based on a type of routing that is to be performed.

11. The method according to claim 9, wherein the IP address and the port identifier are used to obtain the match from the TCAM memory device.

12. The method according to claim 11, wherein the action obtained from the action table is a layer 3 switch action.

13. The method according to claim 8, wherein the action obtained from the action table is a next hop index used to obtain routing information for the packet.

* * * * *